Dec. 22, 1925.  1,566,646
W. BREWSTER ET AL
SHADE FOR AUTOMOBILE WINDSHIELDS
Filed July 14, 1925
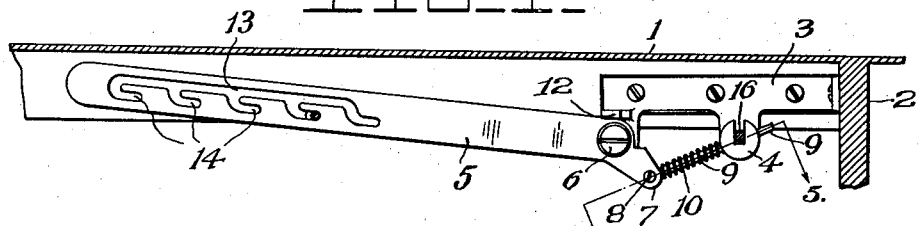
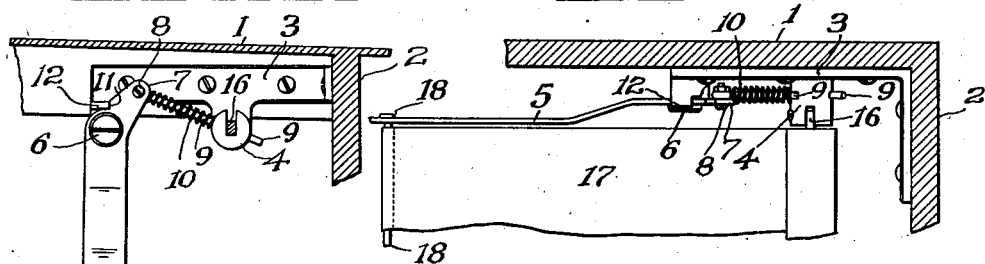
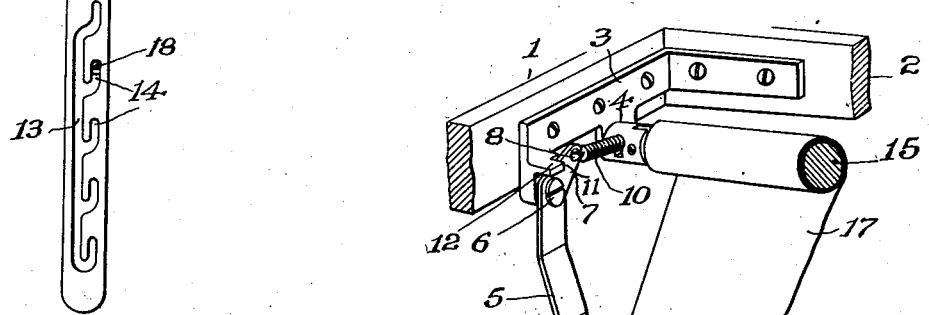
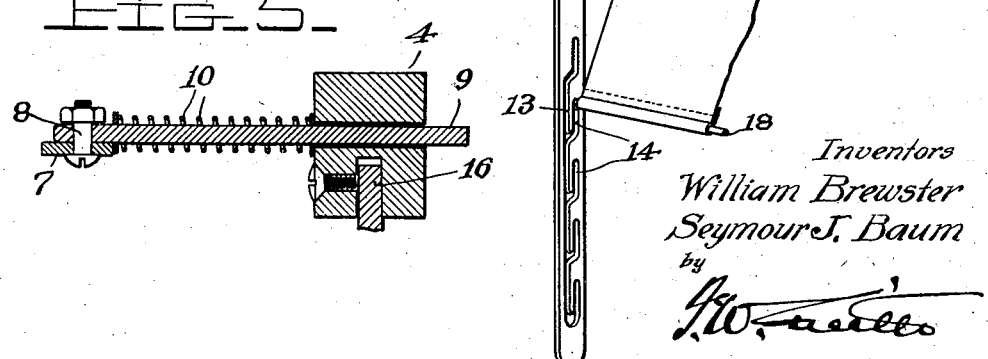
Inventors
William Brewster
Seymour J. Baum
by
Attorney Patented Dec. 22, 1925.

1,566,646

UNITED STATES PATENT OFFICE.

WILLIAM BREWSTER, OF NEW YORK, AND SEYMOUR J. BAUM, OF FLUSHING, NEW YORK.

SHADE FOR AUTOMOBILE WINDSHIELDS.

Application filed July 14, 1925. Serial No. 43,440.

*To all whom it may concern:*

Be it known that we, WILLIAM BREWSTER, a citizen of the United States, residing at the city of New York, county of New York, and State of New York, and SEYMOUR J. BAUM, also a citizen of the United States, residing at Flushing, county of Queens, and State of New York, have invented certain new and useful Improvements in Shades for Automobile Windshields; and we do declare the following to be a full, clear, and exact description of the invention, such as will enable others skilled in the art to which it appertains to make and use the same.

Our invention has reference to inside shades for automobile windshields, the main object being to so support the shade that it may be readily swung into position for use, and also swung upward entirely out of the way when not in use.

The advantages of the construction will be apparent from the description to follow, taken in connection with the accompanying drawings which are to be read as a part of this application, and in which—

Figure 1 is a broken sectional elevation of the roof portion of an automobile body showing one of the brackets and pivoted levers in position for use, the lever being shown as swung to its upper position—

Figure 2 is a similar view showing the lever swung downward in position for use—

Figure 3 is a broken top view with the automobile roof and front sectioned, and showing the proper relative positions of the shade and several parts when the levers are swung upward—

Figure 4 is a perspective view with the roof and front of the automobile body broken away, and showing the position of all parts when the levers have been swung downward and the shade slightly lowered, and Figure 5 is a section at the line 5—5 of Figure 1.

Similar numerals of reference denote like parts in the several figures of the drawing.

As a preliminary to the description, we desire to call attention to the fact that there are two sets of fixtures and structures which are exactly alike, and that these sets are located opposite each other and on opposite sides of the automobile body, and, since it is necessary to describe only one of these sets, it must be borne in mind that one side of the shade roller and shade is connected with one of these sets, while the other side of said roller and shade is connected with the other set.

1 represents the roof of an automobile body and 2 one of the front pillars.

3 is a rectangular bracket which is secured to said body near the roof and to said pillar, and which carries a shade roller fixture 4 of ordinary style.

5 is a lever pivoted near its outer end to the rear of the bracket 3, as shown at 6, and extending beyond this pivotal point and at an angle to the main lever is an ear 7 which is preferably integral with the lever.

Pivoted at 8 to this ear is a pin 9 which extends freely through the fixture 4, and surrounding this pin is a coil spring 10 whose ends are abutted against said ear 7 and fixture.

Referring to Figure 1, it will be clear that when the lever is swung downward the spring will be compressed until the point 8 has been carried upwardly beyond the plane of the point 6, whereupon the resiliency of the spring will throw the lever downward and bring the shoulder 11 on the ear into abutment with the front of the shoulder 12 on the bracket, these shoulders being so located that their abutment occurs when the lever has assumed its proper downward adjustment.

Also, when the lever is swung to its upward position the spring functions to throw the lever upwardly as soon as the point 8 has passed below the plane of the point 6, and this will cause the lever near its pivotal point to abut the bottom of the shoulder 12.

Each of these levers 5 has formed therein an elongated runway 13 within one wall of which are notches or recesses 14.

15 is an ordinary spring shade roller whose end trunnions 16 are housed within the fixtures 4, as shown in the instance of one side of the roller at Figure 3.

17 is a shade carried by this roller and having at its lower end a rod 18 which extends beyond the shade at each side into the runway 13.

The improvement is utilized by pulling down the lever 5 to the position shown at Figure 4, lowering the shade as desired and engaging the rod 18 with the proper recess 14.

When the shade is no longer required, the lever is merely pushed upward to the position shown at Figures 1 and 3, where it is entirely out of the way.

What is claimed is:—

1. An inside shade for an automobile windshield, comprising brackets secured to the front roof portions of the automobile body at opposite sides thereof and carrying shade fixtures, a spring shade roller secured within said fixtures, a shade carried by said roller and having at its lower end a rod which extends beyond the shade at each side, elongated notched levers pivoted near their outer ends to said brackets and having ears adjacent said pivotal points, and spring elements intermediate said fixtures and ears whereby said levers are retained at the limits of their upward and downward swings.

2. An inside shade for an automobile windshield, comprising brackets secured to the front roof portions of the automobile body at opposite sides thereof and carrying shade fixtures, elongated levers pivoted to said brackets and having notched runways, guided spring elements whereby said levers are retained in their operative and inoperative positions, a spring shade roller secured within said fixtures, and a shade carried by said roller and having at the bottom a rod which extends laterally from each side of the shade into said runways and is engageable with the notched portions thereof.

3. A construction as specified in claim 2, in which the outer ends of the levers have ears that are beyond the pivotal points of the levers, while pins are pivoted to said ears and extend freely through openings in said fixtures and are surrounded by coil springs whose ends are in abutment with said ears and fixtures, whereby said springs will function to bring about and retain the adjusted positions of said levers.

In testimony whereof we affix our signatures hereto.

WILLIAM BREWSTER.
SEYMOUR J. BAUM.